June 16, 1953     B. W. HOWLING ET AL     2,642,038

BIRD NEST FRAME

Filed Nov. 27, 1950

Benjamin W. Howling
Marie C. Howling
            INVENTORS

BY *[signatures]*
            Attorneys

Patented June 16, 1953

2,642,038

UNITED STATES PATENT OFFICE 2,642,038

BIRD NEST FRAME

Benjamin W. Howling and Marie C. Howling,
Billings, Mont.

Application November 27, 1950, Serial No. 197,670

3 Claims. (Cl. 119—45)

The present invention relates to certain new and useful improvements in bird nest holding and supporting devices, particularly those used in bird aviaries and equivalent bird breeding and rearing inclosures and more particular reference to a unique holder in the form of an open-type frame. It is a matter of common knowledge to bird breeders and others that the ever existing nest-accident obstacle involves a tremendous loss of eggs, young birds, time and energy during every nesting cycle. Inasmuch as daily inspection and handling of nests is an absolutely necessary step, accidents are bound to occur. The nest ordinarily used is substantially semi-spherical and of wire fabric or the like and has one marginal edge portion flattened and straight across and provided with a depending plate having hooks which are adapted to be hung on bars in the bird cage. Manifestly, such nests are tedious and difficult to handle and are the chief factors in the aforementioned handicaps encountered in an aviary.

The principal object of the instant invention has to do with the adoption and use with a simple, economical and practical nest frame in which manufacturers, users and others will find their daily needs fully met, contained and successfully available.

In carrying out the instant invention a structurally novel open-type frame, constructed of suitable wire or the like, is provided so that bird nests can be safely, easily and quickly handled, even by novices.

The frame adopted is such in construction and design that it will properly cradle and accommodate almost any type of nest pan now on the market. It is completely sanitary in that it can be washed and sterilized regularly with attending ease.

Unsightly and soiled bars on bird cages in breeding activities establishes one objection to be overcome. The instant frame is therefore constructed at one end with readily attachable and detachable suspension hooks and is further constructed beneath said hooks with spacing and abutment means to rest against the cage bars. Therefore, the nest which is cradled within the frame is spaced from said bar with the result that hours of cleaning time each day will be saved.

Novelty in addition to the above is predicated on a special lightweight but durable nest frame construction which may be adjusted to position with the use of one hand and which fits into location on the members of any standard wire or wire mesh cage for birds. Then, too, it is such that it may be slid smoothly and unhampered through doorways in cages, whereby to add to the safety factor in handling. In fact the frame is such that it promotes complete safety in that it offsets the likelihood of tipping, rocking or spilling the nest contents almost to complete satisfaction of users.

In addition to the above, the shape of the frame is such that it provides a convenient and sure grip for the handler's fingers. It is characterized by upright leg frames and these have flat bottom portions which are properly braced and which make it possible to stand the frame upright on a level surface for inspection and feeding purposes. This enables hand feeding, wherever desirable and necessary, with a minimum of time loss and difficulties. It also has entertainment value for those who are interested in familiarizing themselves with proper techniques in a satisfactorily governed bird breeding enclosure.

Other objects and advantages will become more readily apparent from the following description and accompanying sheet of drawings.

In the accompanying sheet of drawings wherein like numerals are employed to designate like parts throughout the views.

Figure 1:
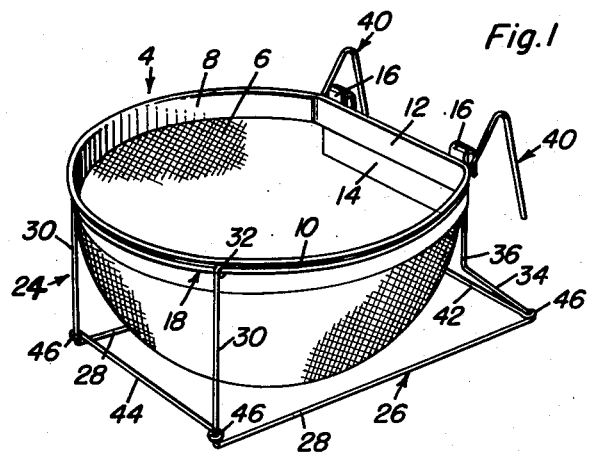
Figure 1 is a perspective view of the combination assemblage, that is, the bird nest or so called pan and the improved frame in which it is removably cradled.
Figure 2:
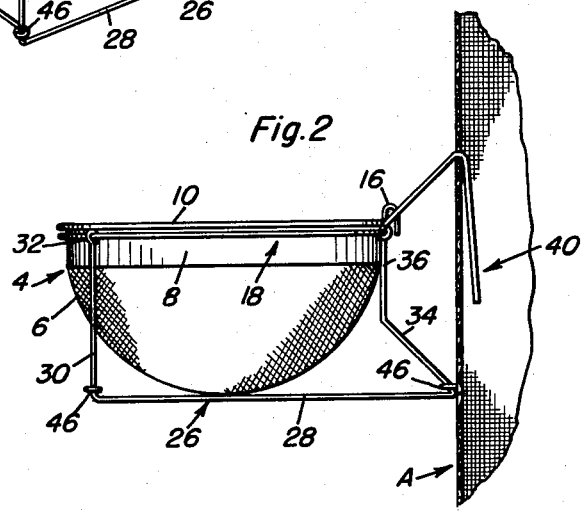
Figure 2 is a side elevational view of the same structure shown in Figure 1 illustrating the manner in which it is hung and thus suspended in a bird breeding cage; and, Figure 3 is a perspective view of the frame per se.
Figure 3:
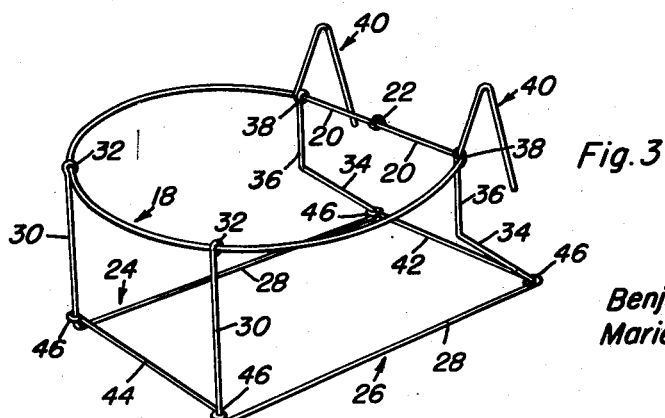

The bird nest, which is of a conventional type, is denoted by the numeral 4 and comprises a substantially semi-spherical receptacle 6 which is provided with a reinforcing metal band or rim 8 having a supporting-ledge flange 10. As best shown in Figure 2, one side portion of the rim is flattened and straight across, as at 12, and is provided an apron plate 14 and hanger hooks 16—16. Ordinarily, the apron rests against the bars or body of the bird cage A in a well known manner and the hooks are secured to bars or other supporting members. This means that under ordinary circumstances, the nest is in contact with the cage. The open-type frame is constructed from lengths of wires of appropriate gage and strength. The upper portion of the frame is characterized by a nest cradling and elevating ring 18. The lateral end portions 20—20 are linked and secured together as at 22. There are two vertical parallel leg frames and these are denoted by the numerals 24 and 26 respectively. Each leg frame is of general U-shaped form and both leg frames are identical in construction and a description of one will suffice for both. To this end the straight bight portion is denoted at 28 and a vertical outer leg is denoted at 30. This has an eye 32 on its upper end which is connected with the ring 18. It will be noticed that the bight portion 28 is of a length sufficient that the rear end portion projects well beyond the corresponding end of the cage. This extending end has a leg which has a forward or outward bend 34 and a vertical portion 36 formed with an eye 38 secured to the ring and then formed at its terminal into a V-shaped hook 40. The bill potrions of the hooks 40—40 terminate above the extended end portions of the leg frames 24 and 26. Inner and outer cross braces 42 and 44 are provided and these have their ends formed into eyes 46 which are attached to the adjacent legs. It follows that although the overall frame is sturdy, it is nevertheless light in weight and therefore easy for the user to handle. When the nest is cradled in the ring 18, in the manner shown, the bottom thereof is on a plane slightly above the planes of the bit portions 28—28. It follows that the nest is substantially and wholly enclosed within the limits of the frame and consequently the frame provides satisfactory ways and means of grasping and handling the nest and frame as a combined assemblage.

As brought out in Figure 2, the hooks 40—40 are positioned to enable the bill portions to be readily engaged with the cage and thus supported. The underlying brace 42 provides an abutment and rests against the cage. Consequently, the corresponding end portion of the nest is spaced and suspended effectively from the cage parts.

Novelty is predicated on the broad and specific aspects of the open-type frame by itself and also in combination with a bird nest.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. A bird nest frame of the class described comprising a horizontal nest embracing and supporting ring, hanger hooks attached to and projecting beyond one side of said ring, a pair of opposed spaced parallel U-shaped leg frames disposed beneath said ring, the bight portion of said leg frames being in a common horizontal plane, being linearly straight, the end portions rising vertically from said bight portions and providing supporting legs, the upper ends of said legs being formed into eyes and said eyes embracing coacting portions of said ring and horizontal braces at right angles to and rigidly interconnecting the respective end portions of said leg frames.

2. The structure specified in claim 1, wherein one brace is located beyond the adjacent side of the ring and situated beneath said hooks to cooperate with the hooks in bracing and suspending the ring from the bird cage.

3. A bird nest holder, carrier and support frame comprising a generally circular endless wire ring which is adapted to encircle and support a bird nest, a pair of spaced parallel U-shaped wire leg frames of lengths greater than the diameter of said ring and of vertical heights greater than the depth of the nest which is to be suspended in said ring, corresponding legs of the respective leg frames having their upper ends connected with one end portion of said ring, the other legs having their upper ends joined with the other end of said ring, the latter legs being bent intermediate their ends and the corresponding ends of the respective bight portions of the respective leg frames projecting beyond said other end of said ring, and said last named upper ends being bent upon themselves to provide terminal cage attaching hooks.

BENJAMIN W. HOWLING.
MARIE C. HOWLING.

References Cited in the file of this patent

UNITED STATES PATENTS

| Number | Name | Date |
|---|---|---|
| D. 123,825 | Trilling | Dec. 3, 1940 |
| 791,105 | O'Dell | May 30, 1905 |
| 1,229,866 | Bebb | June 12, 1917 |
| 2,181,495 | Novack | Nov. 28, 1939 |
| 2,275,914 | Lorenz | Mar. 10, 1942 |
| 2,331,511 | Schiffman | Oct. 12, 1943 |